United States Patent
Lund

(10) Patent No.: US 6,723,950 B1
(45) Date of Patent: Apr. 20, 2004

(54) METHOD FOR WELDING THIN TABS IN WIDE SLOTS

(75) Inventor: Jeffrey S. Lund, Forest Lake, MN (US)

(73) Assignee: Medtronic, Inc., Minneapolis, MN (US)

(*) Notice: Subject to any disclaimer, the term of this patent is extended or adjusted under 35 U.S.C. 154(b) by 0 days.

(21) Appl. No.: 10/365,845

(22) Filed: Feb. 12, 2003

(51) Int. Cl.⁷ .............................................. B23K 26/04
(52) U.S. Cl. .................................. 219/121.64; 228/135
(58) Field of Search ...................... 219/121.64, 121.63, 219/121.82; 228/135, 136, 137, 138, 139, 140; 428/598, 596

(56) References Cited

U.S. PATENT DOCUMENTS

| | | | |
|---|---|---|---|
| 2,448,107 A | * | 8/1948 | Mattimore et al. ........... 285/22 |
| 4,049,882 A | * | 9/1977 | Beatty ......................... 429/94 |
| 5,004,656 A | | 4/1991 | Sato et al. |
| 6,225,788 B1 | * | 5/2001 | Kouzu et al. ................ 320/150 |

* cited by examiner

*Primary Examiner*—Kiley Stoner
*Assistant Examiner*—Jonathan Johnson
(74) *Attorney, Agent, or Firm*—Girma Wolde Michael

(57) ABSTRACT

A system and method for reliably welding a relatively thin tab into a relatively wide slot is provided. The system and method forms a protrusion on the tab. When the tab with the protrusion is inserted into the slot, the protrusion causes the tab to be firmly pressed against one side of the slot. With the tab pressed firmly against the side of the slot, the tab can then be welded to the slot. Because the tab is pressed firmly against the side of the slot during welding, the reliability of the welding process is improved. The present invention is applicable to all welding procedures, but is particularly applicable to laser welding used in precision manufacturing. In those applications, the protrusion causes the tab to be firmly held against the side of the slot while the laser welds the tab and slot together.

16 Claims, 7 Drawing Sheets

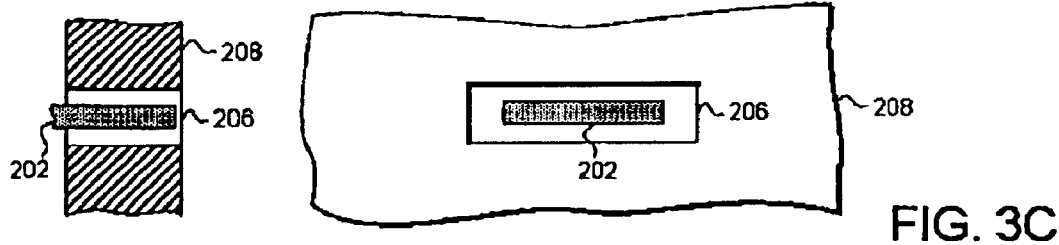
FIG. 3B
FIG. 3C
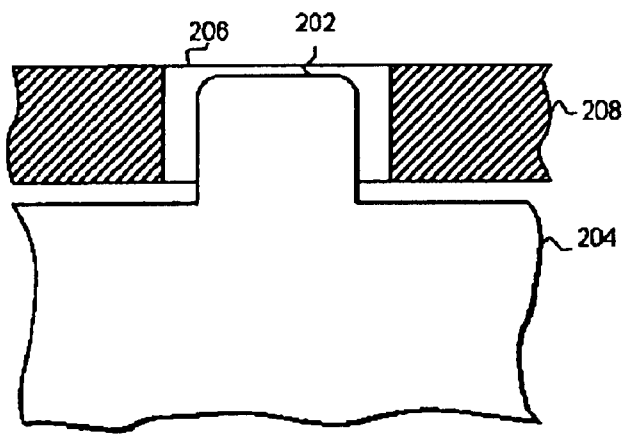
FIG. 3A

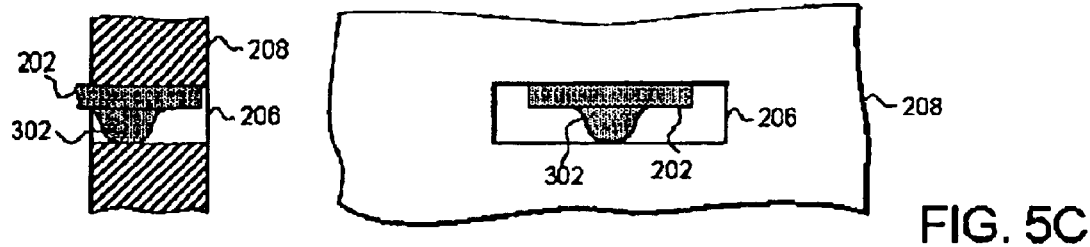
FIG. 5B
FIG. 5C
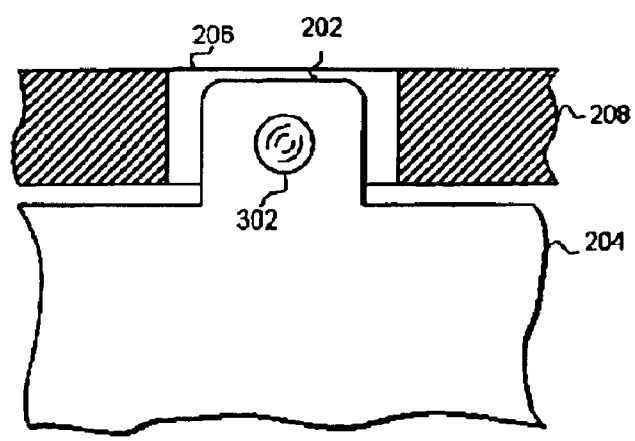
FIG. 5A

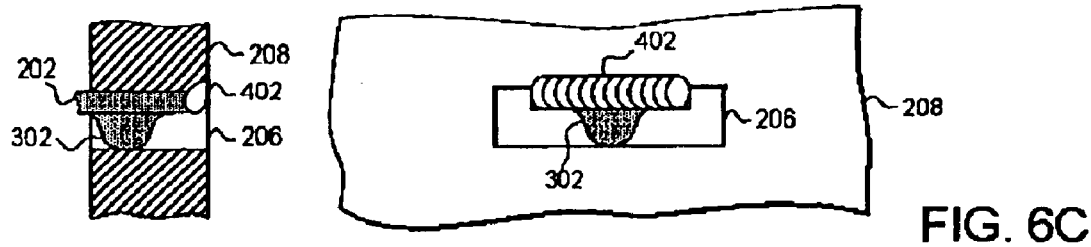
FIG. 6B
FIG. 6C
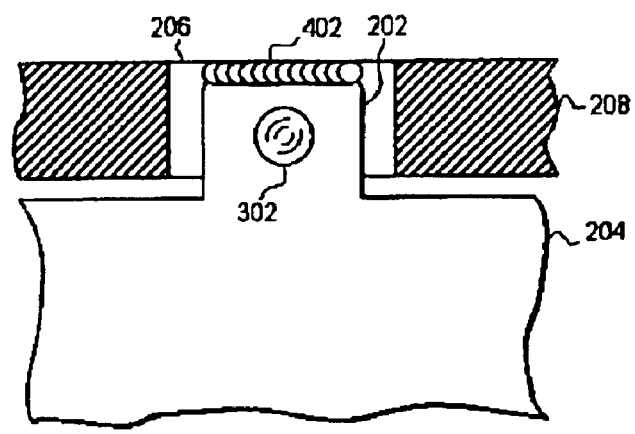
FIG. 6A

METHOD FOR WELDING THIN TABS IN WIDE SLOTS

FIELD OF THE INVENTION

This invention generally relates to manufacturing, and more specifically relates to precision welding.

BACKGROUND OF THE INVENTION

Modern manufacturing relies on the ability to reliably precise attach disparate pieces together in an automated fashion. One commonly used technique is welding. Welding is the heating of metals, causing them to melt and flow together. The heat used to weld together materials can be applied through electricity or other means. In processes that require high degrees of precision, a laser can be used to accurately melt the pieces together.

One technical challenge that arises in precision laser welding is the ability to consistently weld pieces together that do not fit tightly together. For example in some situations it is necessary to weld a tab into a slot. The tab is placed in the slot and then subjected to the welder, which causes the materials to melt and flow together. This welding process thus makes a permanent physical connection between the tab and the slot.

Unfortunately, it can be difficult to consistently weld a thin tab to a relatively wide slot. This difficulty occurs because of the propensity for the thin tab to move within the slot if it cannot be held fixed in place. In particular, if the tab is not firmly pressing against one side of the slot when the laser weld occurs, the materials may not flow together sufficiently to create a solid weld between the tab and the side of the slot. These failures negatively impact reliability and can dramatically reduce the yield of the welding system.

While this problem can be alleviated in some circumstances by narrowing the width of the slot or widening the thickness of the tab, this cannot be done in all applications. For example, in some applications the minimum width of the slot is determined by the manufacturing process used to create the slot. For example, if the slot is created by a punch, then the minimum width of the slot may be determined by the minimum thickness for which a punch can be reliably used. Likewise, the thickness of the tab may be limited to the thickness of the material from which the tab is created.

All of these applications require the ability to reliably weld a relatively thin tab into a relatively wide slot. Thus, what is needed is an improved system and method for welding a relatively thin tab into a relatively wide slot that improves the reliability and yield of the system.

BRIEF SUMMARY OF THE INVENTION

The present invention provides a system and method for reliably welding a relatively thin tab into a relatively wide slot. The system and method forms a protrusion on the tab. When the tab with the protrusion is inserted into the slot, the protrusion causes the tab to be firmly pressed against one side of the slot. With the tab pressed firmly against the side of the slot, the tab can then be welded to the slot. Because the tab is pressed firmly against the side of the slot during welding, the reliability of the welding process is improved.

The present invention is applicable to all welding procedures, but is particularly applicable to laser welding used in precision manufacturing. In those applications, the protrusion causes the tab to be firmly held against the side of the slot while the laser welds the tab and slot together.

The foregoing and other objects, features and inventive elements of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and:

FIGS. 3A, 3B, and 3C are schematic views of a tab inserted into a slot;

FIGS. 5A, 5B and 5C are schematic views of a tab with a protrusion inserted into a slot;

FIGS. 6A, 6B and 6C are schematic view of the tab welded to the slot; and

DETAILED DESCRIPTION OF THE INVENTION

The present invention provides a system and method for reliably welding a relatively thin tab into a relatively wide slot. The system and method forms a protrusion on the tab. When the tab with the protrusion is inserted into the slot, the protrusion causes the tab to be firmly pressed against one side of the slot. With the tab pressed firmly against the side of the slot, the tab can then be welded to the slot. Because the tab is pressed firmly against the side of the slot during welding, the reliability of the welding process is improved. The present invention is applicable to all welding procedures, but is particularly applicable to laser welding used in precision manufacturing. In those applications, the protrusion causes the tab to be firmly held against the side of the slot while the laser welds the tab and slot together.

Figure 1:
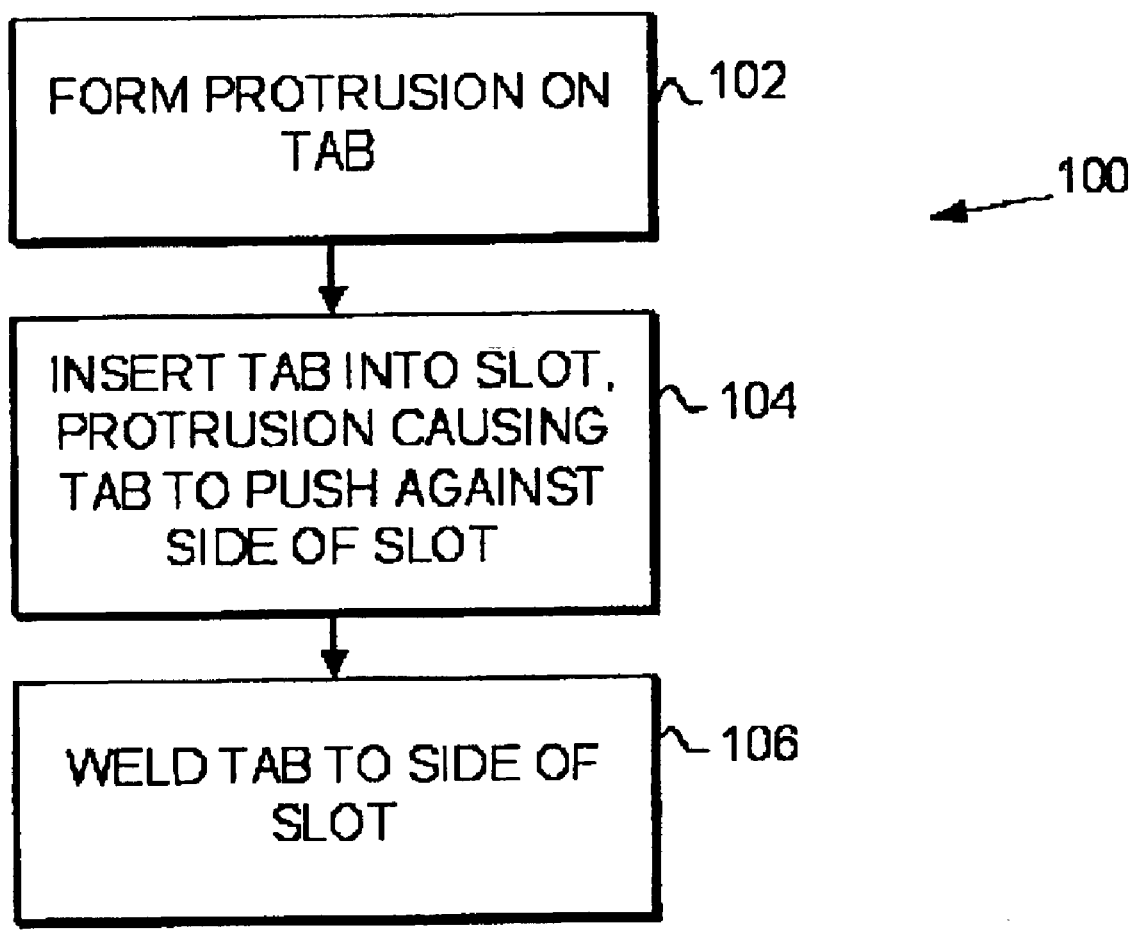
FIG. 1 is a flow diagram of a method for attaching a relatively thin tab to a relatively wide slot.

Turning now to FIG. 1, a flow diagram of a method 100 for attaching a relatively thin tab to a relatively wide slot is illustrated. The first step 102 in method 100 is to form a protrusion on the tab. The main purpose of the protrusion is to cause a side tab to be firmly pressed against a side of the slot during welding. As such, the protrusion can be made with many different suitable methods. For example, the protrusion can be made by using a punch and die set, with the punch being pressed into the tab. When pressed into a side of the tab, the punch forms a protrusion in the form of a dimple on the other side of the tab. The size and shape of the punch used would depend upon the size and shape of the desired protrusion. The force applied to the punch would likewise depend upon the depth of the desired protrusion, as well as the thickness of the tab material. In manufacturing, the punch can be applied individually by hand, using a hand tool such as a hammer or pair of pliers. Conversely, the punch can be applied using any automated manufacturing procedures, such as with a computer controlled punch and die set. Of course, other methods can be used to form a protrusion on the tab. For example stamping, welding, and other methods can be used to form a protrusion on the tab.

As stated above, the depth of the protrusion can be determined by the size and shape of the punch, and the force applied to the punch during the process. It is generally desirable to form the protrusion with a depth such that the resulting tab-protrusion combination will fit snugly within the slot. This allows the tab with the protrusion to be easily inserted into the slot, while insuring that other side of the tab will be firmly held against the side of the slot when the tab is fully inserted. Thus, the desired depth of the protrusion will depend upon the relatively thickness of the tab and the slot opening.

Furthermore, the location of the protrusion relative to the end of the tab (that gets welded) and the depth (or thickness) of the slot it is welded to are important. Preferably, the dimple should be far enough away from the end of the tab to be welded such that the tab material lies flat against the wall of the slot to at least the depth of weld penetration. Otherwise, an open or poor weld may result. The protrusion should also be located on the tab such that the "peak" of the protrusion engages the opposite wall of the slot when the tab end to be welded is in position in the slot. Otherwise, the tab end may not be held against the wall of the slot during welding.

Returning to method 100, the next step 104 is to insert the tab into the slot, with the protrusion causing the tab to push against a side of the slot. As stated above, the depth of the protrusion was selected to allow easy insertion of the tab into the slot while insuring that the other side of the tab is pressed firmly against slot by presence of the protrusion. Thus, step 104 results in one side of the tab being pressed firmly against one side of the slot.

The next step 106 is to weld the tab to the side of the slot. This welding can be performed using any suitable procedure. For example, a laser welding directed toward the slot and tab can be used. Other welding methods could also be used, including plasma, electron beam, and tungsten inert gas (TIG). Because of the protrusion, the tab is pressed firmly against the side of the slot during welding. Because the tab and slot are less likely to move away from each other during welding, the protrusion has the effect of improving the probability that the weld will effectively bond the tab and slot together.

Figure 2B:
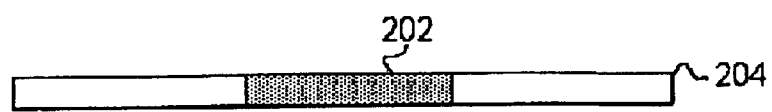
FIGS. 2A and 2B are schematic views of a tab.
Figure 2A:
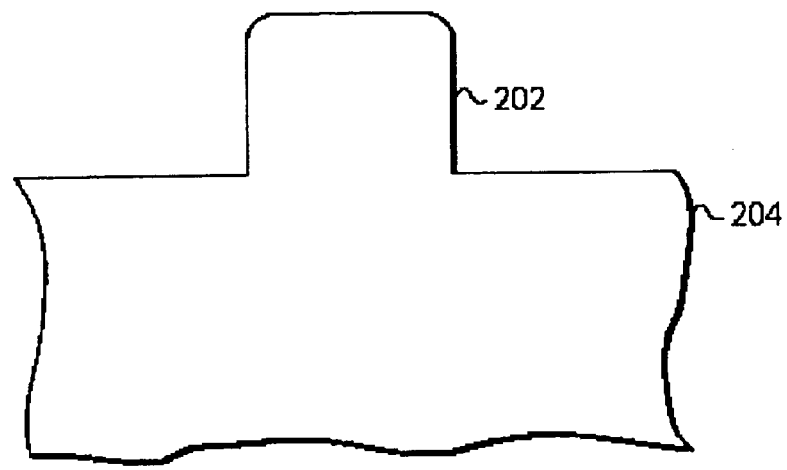

Turning now to FIGS. 2A and 2B, an exemplary tab is illustrated. Specifically, FIG. 2A illustrates a partial top view of a structure 204 from which a tab 202 extends. FIG. 2B similarly illustrates a side view of structure 204 and tab 202. FIGS. 2A and 2C thus give one example of the type of tab that can be attached using the described methods. The structure 204 can comprise any structure that includes such a tab. In one example, the structure 204 comprises a thin plate of material used to form an electrode in a battery, and the tab 202 is formed extending from the electrode to connect the electrode.

Turning now to FIGS. 3A, 3B and 3C, the tab 202 is illustrated inserted into an exemplary slot 206 that is part of a structure 208. Specifically, FIG. 3A illustrates a partial top a view of the tab 202 inserted into the slot 206. Likewise, FIG. 3B illustrates a partial side view of the tab 202 inserted into the slot 206. Finally, FIG. 3C illustrates an end view of the tab 202 inserted into the slot 206.

As can be seen in FIGS. 3B and 3C, where the width of the slot 206 is relatively greater than the thickness of the tab 202, the tab is free to move around within the slot 206. As discussed above, this can lead to failures in the laser welding process. In particular, when the tab 202 is not pressed against a side of the slot 206 when laser welding occurs there is an increased likelihood that the tab 202 will not properly bond to the slot 206.

Figure 4B:
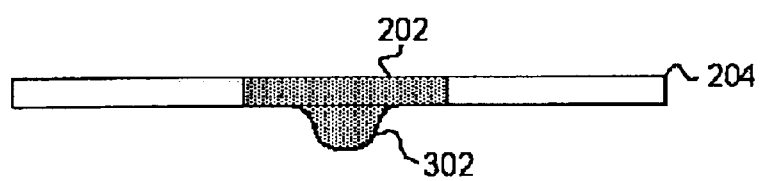
FIGS. 4A and 4B are schematic view of a tab with a protrusion formed on the tab.
Figure 4A:
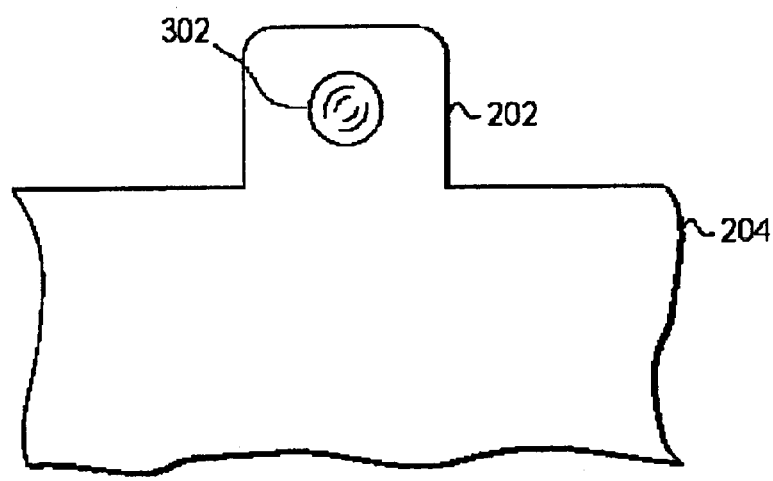

Turning now to FIGS. 4A and 4B, the exemplary tab is illustrated with a protrusion formed on the tab. Specifically, FIG. 4A illustrates a partial top view of a structure 204 from which a tab 202 extends, and the protrusion 302 formed on a side of the tab 202. FIG. 4B similarly illustrates a side view of structure 204 and tab 202, with the protrusion 302 formed on the tab.

The protrusion 302 illustrated in FIGS. 4A and 4B is partially spherical in shape. Such a protrusion can be formed with a punch that has a semi-spherical end. When pressed into the tab, the semi-spherical punch creates a protrusion that is as semi-spherical in nature and can be used in the described method.

Turning now to FIGS. 5A 5B and 5C, the tab 202 with the protrusion 302 is illustrated inserted into an exemplary slot 206 that is part of a structure 208. Specifically, FIG. 5A illustrates a partial top view of the tab 202 with the protrusion 302 inserted into the slot 206. Likewise, FIG. 5B illustrates a partial side view of the tab 202 with the protrusion 302 inserted into the slot 206. Finally, FIG. 5C illustrates an end view of the tab 202 with the protrusion 302 inserted into the slot 206.

As can be seen in FIGS. 5B and 5C, when the tab 202 is inserted into the slot 206, the protrusion 302 causes the other side of tab 202 to be pressed against a side of the slot 206. As discussed above, ensuring that one side of the tab 202 is pressed against a side of the slot 206 during the laser welding process improves the likelihood that the laser welding will result in a well formed bond. This improves the overall reliability of the welding system, and can thus increase the throughput of the manufacturing system.

Turning now to FIGS. 6A 6B and 6C, the tab 202 with the protrusion 302 is illustrated after it has been welded to the slot 206. Specifically, FIG. 6A illustrates a partial top view of the tab 202 with the protrusion 302 welded to the slot 206 with a weld 402. Likewise, FIG. 6B illustrates a partial side view of the tab 202 with the protrusion 302 welded to the slot 206 with weld 402. Finally, FIG. 6C illustrates an end view of the tab 202 with the protrusion 302 welded to the slot 206 with weld 402. As illustrated in these FIGS, with tab 202 is pressed against a side of the slot 206 during the laser welding process the quality of the weld 402 is improved.

It should again be noted that the height of protrusion 302 is preferably selected to ensure that the tab 202 is pressed against the side of the slot 206, while not being so large as to unduly interfere with the insertion of the tab 202 into the slot 206. It is also generally preferable to form the protrusion away from the leading edge of the tab. As illustrated in FIG. 4A, the protrusion is formed away from the leading edge of tab 202, where the leading edge is the edge that is inserted first into the slot. Forming the protrusion away from the leading edge generally makes it easier to insert the tab into the slot, as the narrow leading edge serves to self center the tab in the slot during insertion. Furthermore, forming the protrusion away from the leading edge generally allows the leading edge to lie flat against the side of the slot to at least the depth of weld penetration, again improving the reliability of the weld.

Figure 7B:
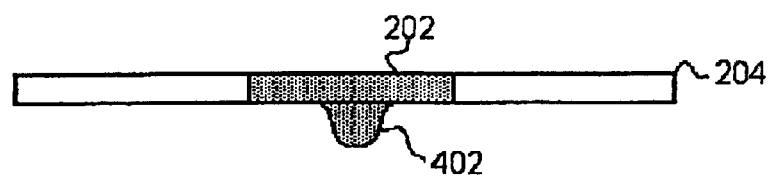
FIGS. 7A and 7B are schematic views of a tab with an elongated protrusion.
Figure 7A:
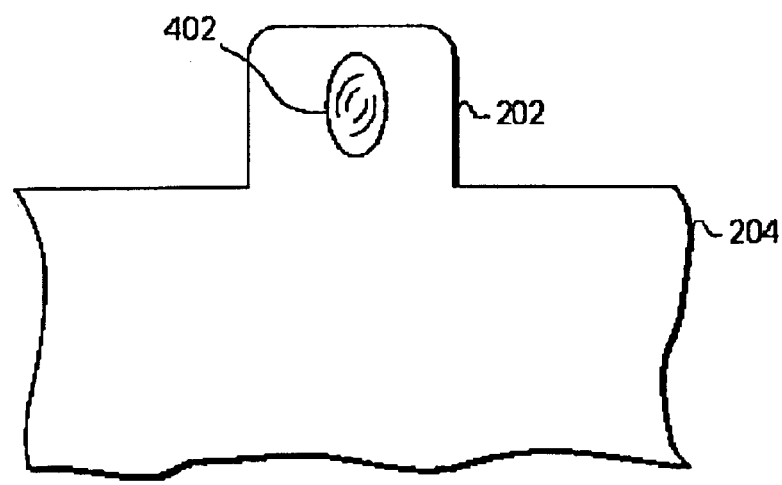

It should also be noted that while the protrusion 302 is illustrated as a circular protrusion, that other shapes and forms could also be used. Turning to FIGS. 7A and 7B, the tab 202 is illustrated with a more elliptical shaped protrusion 402. This type of protrusion can be formed using a punch and die with a more elongated shape, such as a rectangular shape. Again, this is just another example of the type of protrusion that can be used in present invention.

It should be noted that a protrusion with a relatively flat top (as opposed to a relatively sharp peak) provides a bearing surface that may allow for easier Insertion of the tab into the slot. Also, using a protrusion design with the least steep slope allowable will aid In the insertion of the tab into the slot much the same as a wedge.

The methods of the present invention can be applied to a variety of manufacturing processes. On noteworthy example is in the manufacturing of batteries. In battery manufacturing it can be required to laser weld a tab made from the cathode grid to a slot in an Interconnect plate. Electrochemical batteries contain anode (−) and cathode (+) electrodes. To make the power of the battery available for work, the electrodes must be connected to external terminals. In some battery designs, tabs on the electrodes are connected directly to the battery case components. In other battery designs electrodes are connected to the external terminals via interconnects, commonly called a jumpers.

Interconnects provide the electrical connection between the electrodes and the terminals. Interconnects are generally used where the battery design makes it difficult to make a direct connection. This is because the use of an interconnect adds additional parts, operations and cost to the battery.

Interconnects may take the form of a segment of wire or as a slotted weld plate, for example. In some of these designs, the external battery terminal is resistance spot welded to the interconnect and the electrode tabs are laser welded to a slot wall in the interconnect, thus forming the electrical connection. In these applications, using the described methods of forming a protrusion on the tab helps improve the reliability of the weld between the electrode and the interconnect and thus minimizes the costs associated with using an interconnect by simplifying the process and reducing scrap because of poor welds.

The present invention thus provides a system and method for reliably welding a relatively thin tab into a relatively wide slot. The system and method forms a protrusion on the tab. When the tab with the protrusion is inserted into the slot, the protrusion causes the tab to be firmly pressed against one side of the slot. With the tab pressed firmly against the side of the slot, the tab can then be welded to the slot. Because the tab is pressed firmly against the side of the slot during welding, the reliability of the welding process is improved. The present invention is applicable to all welding procedures, but is particularly applicable to laser welding used in precision manufacturing. In those applications, the protrusion causes the tab to be firmly held against the side of the slot while the laser welds the tab and slot together.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A method for attaching a tab to a slot, the method comprising the steps of:
   a) forming a protrusion on the tab;
   b) inserting the tab into the slot, the protrusion causing a first side of the tab to be pressed against a first side of the slot; and
   c) bonding the first side of the tab to the first side of the slot.

2. The method of claim 1 wherein the step of forming a protrusion on the tab comprises partially punching the tab to form a bump in the tab.

3. The method of claim 1 wherein the tab has a first edge that is first inserted into the slot, and wherein the protrusion is set back in the tab from the first edge.

4. The method of claim 3 wherein the protrusion is set back in the tab a distance equal to or greater then a weld depth used to bond the first side of the tab to the first side of the slot.

5. The method of claim 1 wherein the step of bonding the first side of the tab to the first side of the slot comprises welding.

6. The method of claim 5 wherein the welding comprises laser welding.

7. The method of claim 1 wherein the tab comprises a portion of a battery electrode, and wherein the slot comprises a portion of an interconnect plate.

8. The method of claim 1 wherein the step of forming a protrusion on the tab comprises using a punch having a semi-spherical end.

9. The method of claim 1 wherein the tab has a thickness and wherein the slot has a width, and wherein the tab thickness is substantially greater than the slot width.

10. A method for welding a tab to a slot, the tab including a first side and a second side, and the slot including a first side and a second side, wherein the tab has a thickness and wherein the slot has a width, and wherein the tab thickness is substantially greater than the slot width, the method comprising the steps of:
   a) forming a protrusion on the tab second side, the protrusion having a top;
   b) inserting the tab into the slot, wherein when the tab is inserted into the slot the protrusion top abuts the slot second side causing the tab first side to be pressed against the slot first side; and
   c) laser welding the first side of the tab to the first side of the slot.

11. The method of claim 10 wherein the step of forming a protrusion on the tab second side comprises partially punching the tab to form a bump in the tab.

12. The method of claim 11 wherein partially punching the tab comprises punching with a punch having a semi-spherical end.

13. The method of claim 10 wherein the tab has a first edge that is first inserted into the slot, and wherein the protrusion is set back in the tab from the first edge.

14. The method of claim 13 wherein the protrusion is set back in the tab a distance equal to or greater then a weld depth occurring in the step of laser welding the first side of the tab to the first side of the slot.

15. The method of claim 10 wherein the tab comprises a portion of a battery electrode, and wherein the slot comprises a portion of an interconnect plate.

16. A method for welding a battery electrode to an interconnect, the method comprising the steps of:
   a) providing a tab on the battery electrode, the tab having a thickness, the tab including a first side, a second side, and a leading edge;
   b) providing a slot in the interconnect, the slot having a width substantially greater than the tab thickness, the slot including a first side and second side;
   c) forming a protrusion on the tab second side, the protrusion having a top, wherein the protrusion is formed set back in the tab from the leading edge;
   d) inserting the tab into the slot in the interconnect, wherein when the tab is inserted into the slot the protrusion top abuts the slot second side causing the tab first side to be pressed against the slot first side; and
   e) welding the first side of the tab to the first side of the slot.

* * * * *